(12) United States Patent
Hassaan et al.

(10) Patent No.: US 11,468,001 B1
(45) Date of Patent: Oct. 11, 2022

(54) PROCESSING-IN-MEMORY CONCURRENT PROCESSING SYSTEM AND METHOD

(71) Applicant: ADVANCED MICRO DEVICES, INC., Santa Clara, CA (US)

(72) Inventors: Muhammad Amber Hassaan, Austin, TX (US); Michael L. Chu, Santa Clara, CA (US); Ashwin Aji, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/217,792

(22) Filed: Mar. 30, 2021

(51) Int. Cl.
*G06F 15/78* (2006.01)

(52) U.S. Cl.
CPC ................ *G06F 15/7821* (2013.01)

(58) Field of Classification Search
CPC .. G06F 15/7821; G06F 9/3877; G06F 9/3879; G06F 9/3881; G06F 9/5077; G06F 9/455–45558; G06F 9/3851
See application file for complete search history.

(56) References Cited

U.S. PATENT DOCUMENTS

| | | | | |
|---|---|---|---|---|
| 2014/0189713 | A1* | 7/2014 | Ben-Kiki | G06F 9/3877 718/108 |
| 2014/0359629 | A1* | 12/2014 | Ronen | G06F 9/461 718/102 |
| 2015/0106574 | A1* | 4/2015 | Jayasena | G06F 9/3881 711/154 |
| 2017/0228192 | A1* | 8/2017 | Willcock | G06F 3/0673 |
| 2017/0270056 | A1* | 9/2017 | Chung | G06F 12/1009 |
| 2017/0371805 | A1* | 12/2017 | Jayasena | G06F 12/1027 |
| 2019/0041952 | A1* | 2/2019 | Alameldeen | G06F 1/3287 |
| 2020/0051599 | A1 | 2/2020 | Dobelstein et al. | |
| 2020/0119735 | A1* | 4/2020 | Finkbeiner | G11C 16/26 |
| 2020/0293319 | A1 | 9/2020 | Lee et al. | |
| 2020/0356305 | A1 | 11/2020 | Kim et al. | |

FOREIGN PATENT DOCUMENTS

WO 2016126474 A1 8/2016

OTHER PUBLICATIONS

S. Ghose, A. Boroumand, J. S. Kim, J. Gómez-Luna and O. Mutlu, "Processing-in-memory: A workload-driven perspective," in IBM Journal of Research and Development, vol. 63, No. 6, p. 3:1-3:19, Nov. 1-Dec. 2019 (Year: 2019).*

B. Y. Cho, Y. Kwon, S. Lym and M. Erez, "Near Data Acceleration with Concurrent Host Access," 2020 ACM/IEEE 47th Annual International Symposium on Computer Architecture (ISCA), 2020, pp. 818-831 (Year: 2020).*

(Continued)

*Primary Examiner* — Keith E Vicary (57) ABSTRACT

A processing system includes a processing unit and a memory device. The memory device includes a processing-in-memory (PIM) module that performs processing operations on behalf of the processing unit. An instruction set architecture (ISA) of the PIM module has fewer instructions than an ISA of the processing unit. Instructions received from the processing unit are translated such that processing resources of the PIM module are virtualized. As a result, the PIM module concurrently performs processing operations for multiple threads or applications of the processing unit.

20 Claims, 5 Drawing Sheets

(56) References Cited

OTHER PUBLICATIONS

Loh, Gabriel H., Nuwan Jayasena, M. Oskin, Mark Nutter, David Roberts, Mitesh Meswani, Dong Ping Zhang, and Mike Ignatowski. "A processing in memory taxonomy and a case for studying fixed-function pim." In Workshop on Near-Data Processing (WoNDP), pp. 1-4. 2013. (Year: 2013).*
Ghose, Saugata, et al. "Enabling the adoption of processing-in-memory: Challenges, mechanisms, future research directions." arXiv preprint arXiv: 1802.00320 (2018); 14 pages (Year: 2018).*
Chu et al., "High-level Programming Model Abstractions for Processing in Memory", AMD Research, Advanced Mirco Devices, Inc., URL: https://www.cs.utah.edu/wondp/wondp-pim-hlm-final.pdf, Published 2013, 4 pages.
Lockerman et al., "Livia: Data-Centric Computing Throughout the Memory Hierarchy", ASPLOS '20: Proceedings of the Twenty-Fifth International Conference on Architectural Support for Programming Languages and Operating Systems, DOI: 10.1145/3373376.3378497, dated Mar. 2020, 18 pages.
Pattnaik et al., "Scheduling Techniques for GPU Architectures with Processing-In-Memory Capabilities", 2016 International Conference on Parallel Architecture and Compilation Techniques (PACT), Haifa, Israel, IEEE, DOI: 10.1145/2967938 2967940, Date of Conference: Sep. 11-15, 2016, Date Added to IEEE Xplore: Dec. 1, 2016, 14 pages.
Ahn et al., "A scalable processing-in-memory accelerator for parallel graph processing", In Computer Architecture (ISCA), 2015 ACM/IEEE 42nd Annual International Symposium on. IEEE, 105-117.
Zhang et al., "GraphP: Reducing Communication for PIM-Based Graph Processing with Efficient Data Partition", In High Performance Computer Architecture (HPCA), 2018 IEEE International Symposium on. IEEE, 544-557.
Zhuo et al., "GraphQ: Scalable PIM-Based Graph Processing," in MICRO, 2019.
Khan et al., "A Survey of Resource Management for Processing-in-Memory and Near-Memory Processing Architectures" [ https://arxiv.org/abs/2009.09603 ] J. Low Power Electron. Appl. 2020.
Hybrid Memory Cube Consortium et al. 2015. Hybrid memory cube specification version 2.1. Technical Report.
He et al., "Newton: A DRAM-Maker's Accelerator-in-Memory (AiM) Architecture for Machine Learning", in IEEE Micro , 2020 53rd Annual IEEE/ACM International Symposium on Microarchitecture (MICRO).
Cho et al., "Near Data Acceleration with Concurrent Host Access," 2020 ACM/IEEE 47th Annual International Symposium on Computer Architecture (ISCA), Valencia, Spain, 2020, pp. 818-831, doi: 10.1109/ISCA45697.2020.00072.
Shin et al., "Mcdram: Low latency and energy-efficient matrix computations in dram," IEEE Transactions on Computer-Aided Design of Integrated Circuits and Systems, vol. 37, No. 11, pp. 2613-2622, 2018.
Chi et al., "Prime: A novel processing-in-memory architecture for neural network computation in reram-based main memory," in Proceedings of the 43rd International Symposium on Computer Architecture, ser. ISCA '16. Piscataway, NJ, USA: IEEE Press, 2016, pp. 27-39. [Online]. Available: https://doi.org/10.1109/ISCA.2016.13.
Li et al., "Drisa: A dram-based reconfigurable in-situ accelerator," in Proceedings of the 50th Annual IEEE/ACM International Symposium on Microarchitecture, ser. MICRO-50 '17. New York, NY, USA: Association for Computing Machinery, 2017, p. 288-301. [Online]. Available: https://doi.org/10.1145/3123939.3123977.
Shafiee et al., "Isaac: A convolutional neural network accelerator with in-situ analog arithmetic in crossbars," in Proceedings of the 43rd International Symposium on Computer Architecture, ser. ISCA '16. Piscataway, NJ, USA: IEEE Press, 2016, pp. 14-26. [Online]. Available: https://doi.org/10.1109/ISCA.2016.12.
Seshadri et al., "Ambit: In-memory accelerator for bulk bitwise operations using commodity dram technology," in Proceedings of the 50th Annual IEEE/ACM International Symposium on Microarchitecture, ser. MICRO-50 '17. New York, NY, USA: Association for Computing Machinery, 2017, p. 273-287. [Online]. Available: https://doi.org/10.1145/3123939.3124544.
U.S. Appl. No. 17/135,209, filed Dec. 28, 2020. 37 pages.
International Search Report and Written Opinion dated Jul. 4, 2022 for PCT Application No. PCT/US2022/022357, 9 pages.
Saugata Ghose et al., "Enabling the Adoption of Processing-in-Memory: Challenges, Mechanisms, Future Research Directions", Feb. 2018, https://doi.org/10.48550/arXiv.1802.00320 [Retrieved Jul. 21, 2022], 45 pages.

* cited by examiner

EXAMPLE 300

| KERNEL 1 VIRTUAL REGISTER MAP 302 ||
|---|---|
| INSTRUCTION | REGISTERS |
| LOAD R0 <- [ADDR] | R0 |
| LOAD R1 <- [ADDR] | R1 |
| ADD R2 <- R0, R1 | R2 |
| STORE [ADDR] <- R2 | |

| KERNEL 2 VIRTUAL REGISTER MAP 304 ||
|---|---|
| INSTRUCTION | REGISTERS |
| LOAD R0 <- [ADDR] | R0 |
| LOAD R1 <- [ADDR] | R1 |
| LOAD R2 <- [ADDR] | R2 |
| ADD R3 <- R0, R1 | R3 |
| ADD R3 <- R2, R3 | |
| STORE [ADDR] <- R3 | |

PHYSICAL MAPPING 310

| KERNEL 1 PHYSICAL REGISTER MAP 306 ||
|---|---|
| INSTRUCTION | REGISTERS |
| LOAD [0] <- [ADDR] | [0] |
| LOAD [2] <- [ADDR] | [2] |
| ADD [7] <- [0], [2] | [7] |
| STORE [ADDR] <- [7] | |

| KERNEL 2 PHYSICAL REGISTER MAP 308 ||
|---|---|
| INSTRUCTION | REGISTERS |
| LOAD [3] <- [ADDR] | [3] |
| LOAD [4] <- [ADDR] | [4] |
| LOAD [8] <- [ADDR] | [8] |
| ADD [9] <- [3], [4] | [9] |
| ADD [9] <- [8], [9] | |
| STORE [ADDR] <- [9] | |

EXAMPLE 400

KERNEL 1 INSTRUCTIONS 402

| INDEX | INSTRUCTION |
|---|---|
| 0 | LOAD R0 <- [ADDR] |
| 1 | LOAD R1 <- [ADDR] |
| 2 | ADD R2 <- R0, R1 |
| 3 | STORE [ADDR] <- R2 |

KERNEL 2 INSTRUCTIONS 404

| INDEX | INSTRUCTION |
|---|---|
| 0 | LOAD R0 <- [ADDR] |
| 1 | LOAD R1 <- [ADDR] |
| 2 | LOAD R2 <- [ADDR] |
| 3 | ADD R3 <- R0, R1 |
| 4 | ADD R3 <- R2, R3 |
| 5 | STORE [ADDR] <- R3 |

MERGE AND MAP 420

KERNEL 1 INSTRUCTION INDEX 406

| INDEX | PCS INDEX |
|---|---|
| 0 | 0 |
| 1 | 1 |
| 2 | 5 |
| 3 | 6 |

KERNEL 2 INSTRUCTION INDEX 408

| INDEX | PCS INDEX |
|---|---|
| 0 | 0 |
| 1 | 1 |
| 2 | 2 |
| 3 | 3 |
| 4 | 4 |
| 5 | 7 |

PCS MERGED KERNEL CONTENTS 410

| PCS INDEX | INSTRUCTION |
|---|---|
| 0 | LOAD R0 <- [ADDR] |
| 1 | LOAD R1 <- [ADDR] |
| 2 | LOAD R2 <- [ADDR] |
| 3 | ADD R3 <- R0, R1 |
| 4 | ADD R3 <- R2, R3 |
| 5 | ADD R2 <- R0, R1 |
| 6 | STORE [ADDR] <- R2 |
| 7 | STORE [ADDR] <- R3 |

FIG. 5

PROCESSING-IN-MEMORY CONCURRENT PROCESSING SYSTEM AND METHOD

BACKGROUND

Processing systems often include local memory resources which can be accessed relatively quickly by a processor (e.g., a central processing unit (CPU) or a graphics processing unit (GPU) and external memory resources which take a relatively longer amount of time to access. In some cases, the external memory resources are located on a different chip from the processor. However, in some cases, due to the longer access times, instructions involving data stored at external memory resources take an undesirably long amount of time to process. Additionally, in some cases, data communications between external memory resources and processors consume an undesirable amount of interconnect capacity. In some cases, to reduce the number of accesses to the external memory resources, a processing-in-memory (PIM) circuit is used to process data at the external memory resources, rather than bringing the data to the processor. PIM circuits perform limited processing applications on data stored at the external memory resources without the power consumption or area usage of a more general processor. As a result, in some cases, a number of communications between the processor and the external memory resources is reduced and a processing time of some instructions involving data stored at the external memory resources is reduced. However, due to this limited architecture, taking advantage of hardware parallelism to process multiple kernels concurrently is difficult. For example, due to a lack of virtualization, PIM circuits only load commands of one kernel at a time, in some cases creating a serialization bottleneck due to data dependencies.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

A processing system includes a processing unit and a memory device external to the processing unit. The memory device includes a processing-in-memory (PIM) module that processes data on behalf of the processing system. An instruction set architecture (ISA) of the of the PIM module is smaller than an ISA of the processing unit such that, in some cases, the PIM commands are a subset of the instructions of the ISA of the processing unit. For example, in some cases, the PIM module is an arithmetic logic unit (ALU). As a result, additional instructions are sent to the PIM module, as compared to a processor such as a CPU sending instructions to another processor such as a GPU. In some embodiments, the additional instructions are sent as kernel instructions that indicate PIM commands to be performed. In response to the kernel instructions, the PIM module processes PIM commands using data stored at the memory device.

In some cases, the PIM module concurrently processes PIM commands of multiple applications, or different threads of a same application. Address virtualization is generally used to prevent errors due to multiple applications attempting use a single address and reduce potential security issues due to applications receiving information about other applications due to the use of physical addresses. However, address virtualization is difficult in some PIM modules due to the relative simplicity of the PIM modules, as compared to a processing unit. As a result, those PIM modules give access to resources (e.g., PIM modules and associated storage devices such as register files) serially. In some embodiments, the instant memory device further includes a PIM kernel scheduler that performs virtual-to-physical register mapping on behalf of the PIM module, enabling register address virtualization at the memory device, and enabling the PIM module to concurrently process multiple kernels.

The PIM commands are stored at a PIM command store (PCS) module. However, in some embodiments, storage space in the PCS module is limited. As a result, in some cases, the PIM kernel scheduler further analyzes incoming kernel instructions to identify whether multiple sets of instructions request the same operation. In response to detecting that a same operation is requested, the PIM kernel scheduler combines the kernel instructions, causing the PCS module to store only a single PIM command. As a result, resource utilization by the PCS module is increased. Further, in some embodiments, PCS addresses are virtualized such that instructions of multiple kernels are stored in the PCS module at the same time. Accordingly, in some cases, in response to detecting that a same operation is requested by multiple kernels, the PIM kernel scheduler combines the kernel instructions from the multiple kernels.

As used herein, "concurrently process" refers to execution of at least a portion of an application or kernel subsequent to starting but prior to completion of a portion another application or kernel. For example, if portions of two kernels are executed in an interleaved manner such that a portion of a second kernel is executed subsequent to a first portion of a first kernel but prior to a second portion of the first kernel, the first and second kernels are considered to be "concurrently processed." As another example, a pipelined processor where a portion of a first kernel is in a first portion of the pipeline and a portion of a second kernel is in a second portion of the pipeline is considered to be "concurrently processing" the two kernels. The two applications or kernels do not need to be processed by the exact same hardware device at the exact same time to be considered "concurrently processed."

The techniques described herein are, in different embodiments, employed using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which processing modules are employed. However, it will be understood that the systems and techniques described herein apply equally to the use of other types of parallel processors unless otherwise noted.

Figure 1:
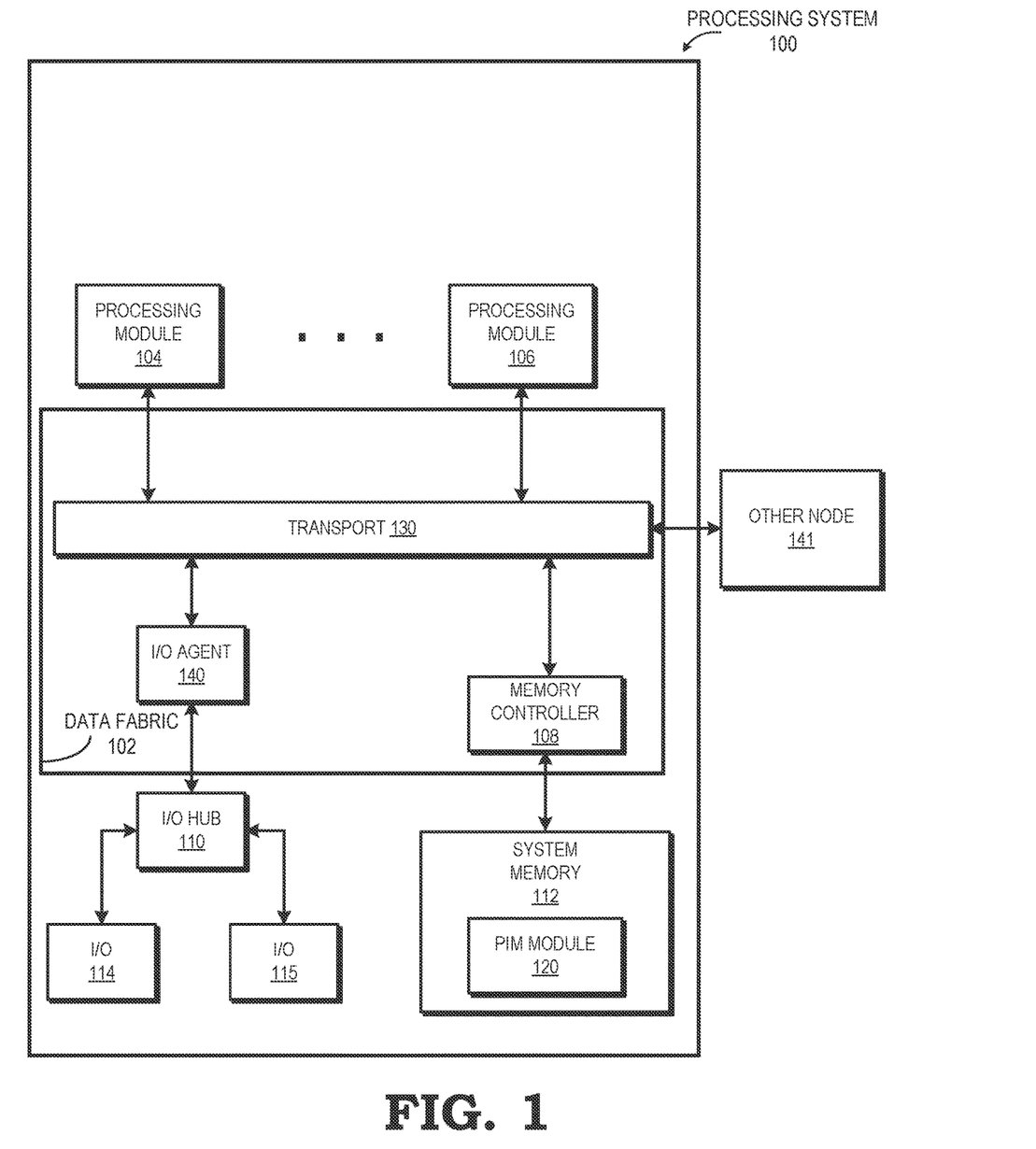
FIG. 1 is a block diagram of a PIM concurrent processing system in accordance with some embodiments.

FIG. 1 illustrates a processing system 100 that concurrently processes applications at a PIM module in accordance with at least some embodiments. The processing system 100 includes a data fabric 102 used to interconnect various components of processing system 100, including a plurality of processing modules, such as processing modules 104-106, one or more memory controllers 108, and one or more I/O hubs 110. Each memory controller 108 in turn is coupled to a system memory 112, and each I/O hub 110 is in turn coupled to one or more I/O devices, such as I/O devices 114, 115. At least one system memory 112 includes a PIM module 120.

Processing modules 104-106 include one or more processor cores and a local cache hierarchy. The processor cores include, for example, CPU cores, GPU cores, DSP cores, parallel processor cores, or a combination thereof. The local cache hierarchy of a processing client includes one or more levels of cache. In some embodiments, at least one of processing modules 104-106 differs from at least one other of processing modules 104-106 (i.e., processing modules 104-106 are heterogeneous). In other embodiments, processing modules 104-106 are homogeneous. In some cases, as further discussed below with reference to FIG. 2, one or more of processing modules 104-106 includes one or more coprocessors that perform tasks on behalf of processing modules 104-106.

The memory controller 108 operates as the interface between the corresponding system memory 112 and the other components of processing system 100. Thus, data to be cached in a local cache hierarchy of a processing client typically is manipulated as blocks of data referred to as "cache lines", and which are addressed or otherwise located in a memory hierarchy using a physical address of system memory 112. Cache lines are accessed from the system memory 112 by the memory controller 108 in response to access requests from a processing client, and the cache lines are installed, or cached, in one or more caches of the processing client. Likewise, when a cache line containing modified data is evicted from a local cache hierarchy of a processing client, and thus needs to be updated in system memory 112, memory controller 108 manages this writeback process. Further, as discussed below with reference to FIGS. 2-5, in some cases, PIM module 120 processes data on behalf of one or more of processing modules 104-106. In some embodiments, processing system 100 includes multiple system memories 112. Additionally, in some embodiments, system memory 112 includes multiple PIM modules 120.

I/O devices 114, 115 operate to transfer data into and out of processing system 100 using DMA access operations. For example, one of the I/O devices 114, 115 can include a network interface card (NIC) for connecting the node to a network for receiving and transmitting data, or hard disk drive (HDD) or other mass storage device for non-volatile storage of relatively large quantities of data for use by processing modules 104-106, and the like. In at least one embodiment, I/O hub 110 manages I/O devices 114, 115 and serves as an interface between data fabric 102 and I/O devices 114, 115. To illustrate, in some embodiments, I/O hub 110 includes a Peripheral Component Interconnect Express (PCIe) root complex so as to operate as a PCIe interconnect between I/O devices 114, 115 and data fabric 102.

Data fabric 102 generally transports commands, data, requests, status communications, and other signaling among the other components of processing system 100, and between processing system 100 and other nodes 141. One such subset of these transport operations is the storage of data provided by the I/O devices 114, 115 at system memory 112 for use by one or more of processing modules 104-106. As discussed further with respect to FIGS. 2-5, in some cases, the data stored at system memory 112 is processed using PIM module 120 in response to kernel instructions sent from one or more of processing modules 104-106 via data fabric 102. I/O agent 140 operates as a coherent agent for I/O hub 110 and I/O devices 114, 115. Further, in some embodiments, transport layer 130 is coupled to the corresponding transport layer of one or more other nodes 141 or to processing modules 104-106 via one or more bridge components or coherent agents (not shown). In various embodiments, data fabric 102 is compatible with one or more standardized interconnect specifications, such as a HyperTransport™ specification or an Infinity Fabric™ specification.

Figure 2:
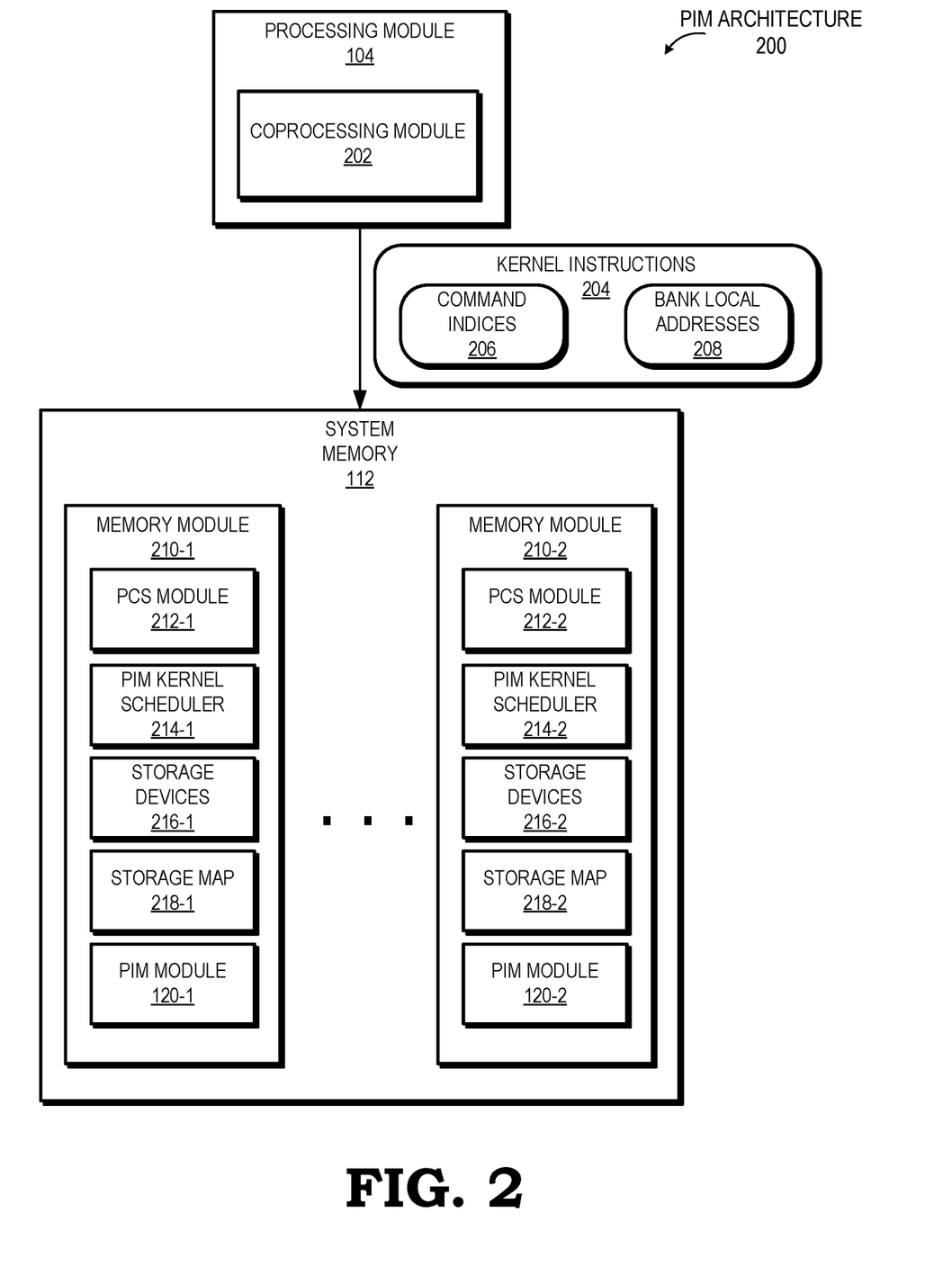
FIG. 2 is a block diagram of a PIM architecture in accordance with some embodiments.

FIG. 2 is a block diagram illustrating a block diagram of a PIM architecture 200 of processing system 100 in accordance with some embodiments. In other embodiments, PIM architecture 200 corresponds to a different processing system that includes additional or fewer components than processing system 100. In the illustrated embodiment, PIM architecture includes at least processing module 104 and system memory 112. Processing module 104 includes coprocessing module 202. System memory 112 includes memory modules 210. Memory modules 210 include PCS modules 212, PIM kernel schedulers 214, storage devices 216, storage maps 218, and PIM modules 120. Although the illustrated embodiment shows a specific configuration of components, in various embodiments, other combinations of components are contemplated. For example, in some embodiments, system memory 112 only includes a single memory module 210. As another example, in some embodiments, processing module 104 does not include coprocessing module 202. Further, in some embodiments, additional components such as buffers or data fabric 102 are contemplated but not illustrated for ease of discussion.

Processing module 104 executes various programs. Data for at least some of those programs is stored at system memory 112 (e.g., in storage devices 216). In some cases, a determination is made to perform at least some processing functions at system memory 112 (e.g., using one or more of PIM modules 120) rather than repeatedly sending data requests and responses between processing module 104 and system memory 112. Accordingly, processing module 104, or, in some cases, coprocessing module 202, sends kernel instructions 204 to system memory 112. In the illustrated embodiment, kernel instructions 204 correspond to multiple applications, different threads within a single application, or both, and are executed as separate PIM kernels in system memory 112. In some embodiments, processing module 104 additionally executes some kernel instructions (e.g., kernel instructions that are not part of an ISA of PIM modules 120 or kernel instructions that PIM modules 120 do not have the bandwidth to perform).

In the illustrated embodiment, kernel instructions 204 include one or more command indices 206 and one or more bank local addresses 208. The command indices 206 indicate PIM commands to be performed by a PIM module (e.g., PIM module 120-1). In some cases, command indices 206 indicate respective PIM commands to be performed via respective instruction identifiers. Further, as described below with reference to FIG. 3, in some cases, at least some of command indices 206 include virtual register addresses that indicate registers within system memory 112 (e.g., within storage devices 216-2) to be used as part of performing the PIM commands. The bank local addresses 208 indicate one or more memory addresses within storage devices of system memory 112 (e.g., storage devices 216-1) to access if the PIM command performs a memory operation (e.g., a load operation). In some embodiments, the bank local addresses 208 are full memory addresses. In other embodiments, the bank local addresses 208 are modified or generated by system memory 112 (e.g., by adding a base address of a memory array to an index of a data element). Because PIM modules 120 have a smaller ISA and fewer hardware resources, as compared to, for example, processing modules 104-106, in some embodiments, separate kernel instructions 204 are sent for each PIM command (e.g., one kernel instruction is sent to perform a load operation and a second kernel instruction is sent to perform an addition operation). In some embodiments, multiple sets of kernel instructions 204 (e.g., five kernel instructions or fifty kernel instructions) for one application or multiple applications are sent together, in some cases causing multiple PIM commands to be stored in respective entries of PCS modules 212 for processing by one or more of PIM modules 120. However, in some embodiments, processing resources (e.g., storage space within PCS modules 212) are limited, and thus smaller groups of kernel instructions 204 are sent. Additionally, as noted above, in some cases, some kernel instructions are executed at processing module 104. Further, in some cases, at least some PIM commands are different from corresponding instructions that would be executed at processing module 104 to perform a similar action. As a result, in some cases, command indices 206 are translated at processing module 104 into corresponding PIM commands. In other embodiments, PIM kernel schedulers 214 translate commands indicated by kernel instructions 204 into corresponding PIM commands.

System memory 112 includes one or more memory modules 210. In various embodiments, memory modules 210 perform operations for a same application or for different applications. In some embodiments, memory modules 210 are dynamic random-access memory (DRAM) devices. However, in other embodiments, memory modules 210 are other types of memory devices (e.g., static random-access memory (SRAM) devices, synchronous DRAM (SDRAM) memory devices, flash memory devices, etc.). In some embodiments, memory modules 210 are a same type of memory device. In other embodiments, memory modules 210 are different memory devices. In some embodiments, one or more of memory modules 210 include fewer or additional components. For example, in some embodiments, PIM kernel scheduler 214-1 corresponds to both memory modules 210-1 and 210-2 and memory module 210-2 does not include PIM kernel scheduler 214-2. In some embodiments, memory modules 210 include respective registers organized as register banks (e.g., physically organized or virtually organized) in storage devices 216. In other embodiments, the registers are part of one or more separate devices associated with one or more of memory modules 210.

PCS modules 212 store PIM commands and send the PIM commands to one or more PIM modules 120 for execution. As further described in the example of FIG. 4, in some embodiments, one or more of PCS modules 212 are virtualized. For example, in some cases PCS module 212-2 stores a sequence of PIM commands to be performed by PIM module 120-2, where the PIM commands are portions of multiple PIM kernels corresponding to multiple respective applications.

PIM kernel schedulers 214 manage the virtualization of the one or more PCS modules 212. For example, as described above, command indices 206 indicate respective PIM commands to be performed. In some embodiments, PIM kernel scheduler 214-2 populates PCS module 212-2 and translates the command indices 206 addressed to PIM module 120-2 into locations within PCS module 212-2, where the respective locations store corresponding PIM commands. Additionally, in some embodiments, one or more of PIM kernel schedulers 214 maintain and populate storage map 218-2, virtual-to-physical mapping tables that indicate physical registers (e.g., of storage devices 216-2) in which data used by the PIM commands is stored. In some embodiments, one or more of storage maps 218 are stored in a storage device physically close to (e.g., on a same chip as) respective PIM modules 120. In some embodiments, one or more of storage maps 218 are separate from memory modules 210 but associated with one or more memory modules 210.

In some embodiments, to reduce PCS resource usage while populating PCS modules 212, PIM kernel schedulers 214 combine portions of at least two kernel instructions 204 corresponding to at least two PIM kernels. For example, as described further below with reference to FIG. 4, if two kernel instructions request "LOAD R0 ← [ADDR]" from PIM module 120-1, the PIM kernel scheduler 214-1 populates a PCS module 212-1 with only a single indication of "LOAD R0 ← [ADDR]", thus saving storage space of PCS module 212-1 and reducing a number of times PCS module 212-1 is programmed. Additionally, in some embodiments, one or more of PCS module 212, PIM kernel schedulers 214, or both are shared between multiple PIM modules 120. Accordingly, in some embodiments, PIM kernel scheduler detects that PIM modules 120-1 and 120-2 are each to perform "LOAD R0 ← [ADDR]" for different PIM kernels and stores only a single indication of "LOAD R0 ← [ADDR]" in PCS module 212-1.

In various embodiments, PIM kernel schedulers 214 additionally determine combinations of PIM kernels to schedule at PIM modules 120, in some cases, delaying execution of at least some PIM commands. These combinations are determined based on combination metrics which indicate various factors such as commonalities of respective kernel instructions between PIM kernels, respective priorities of the PIM kernels, expected resource usage of the PIM kernels (e.g., PIM module usage, memory bandwidth usage, communication bandwidth, etc.), dependencies of the PIM kernels (e.g., indicated in a dependency graph received from processing module 104). In some embodiments, the combinations are indicated by processing module 104 (e.g., from a compiler). In other embodiments, the combinations are determined by PIM kernel schedulers 214 at runtime, such as by receiving a dependency graph of PIM kernels. The order of PIM commands is also determined based on various factors such as commonalities of respective kernel instructions between PIM kernels, respective priorities of the PIM kernels, expected resource usage of the PIM kernels, dependencies of the PIM kernels (e.g., indicated in a dependency graph received from processing module 104), or a time at which the corresponding kernel instructions were received.

PIM modules 120 receive PIM commands from PCS modules 212, processes those PIM commands, in some cases using data stored at storage devices 216 and registers of storage devices 216. In some embodiments, one or more of PIM modules 120 are arithmetic logic units (ALUs). Additionally, in some embodiments, storage devices 216 are register files organized as physical register banks or virtual register banks for PIM modules 120. In some cases, at least some registers of the register banks are allocated to a first kernel while at least some registers of the register banks are allocated to a second kernel. In response to a request from processing module 104 (e.g., via kernel instructions 204), PIM modules 120 return data to processing module 104. Accordingly, processing resources of memory modules 210 are virtualized such that, in some cases, PIM modules 120 concurrently process multiple PIM kernels.

In some embodiments, one or more storage maps 218 and a portion of PIM kernel schedulers 214 corresponding to the one or more storage maps 218 are stored in a scratchpad on processing module 104. As a result, in those embodiments, translation occurs on bank local addresses 208 prior to kernel instructions 204 being sent to system memory 112.

Figure 3:
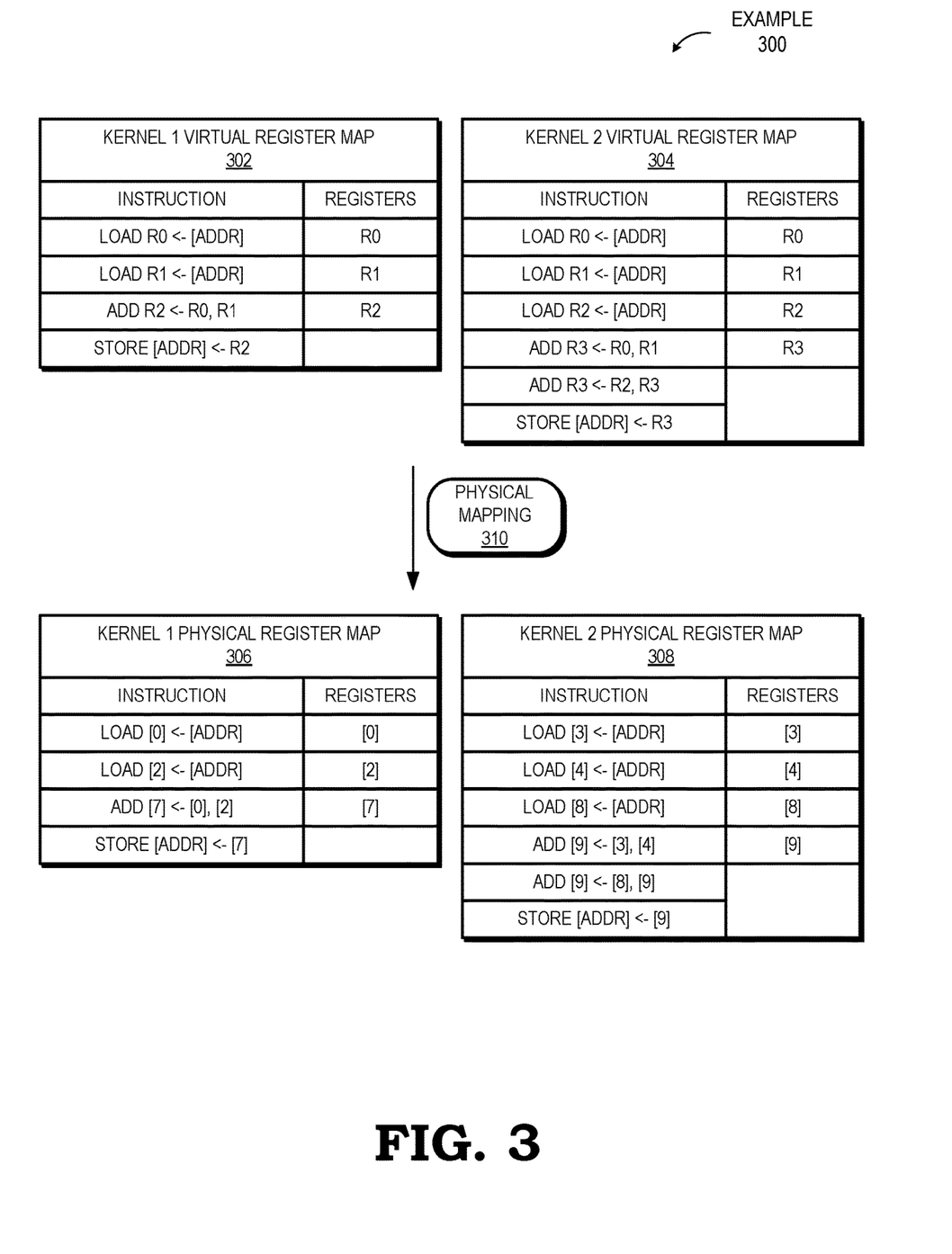
FIG. 3 is a block diagram of an example virtual-to-physical kernel register mapping in accordance with some embodiments.

FIG. 3 illustrates an example 300 virtual-to-physical kernel register mapping 310 in accordance with at least some embodiments. As described above, in some embodiments, the virtual-to-physical kernel register mapping 310 is performed by a PIM kernel scheduler 214 such as PIM kernel scheduler 214-1 of FIG. 2. In the illustrated example 300, kernel 1 virtual register map 302 and kernel 2 virtual register map 304 are received at the PIM kernel scheduler 214. The registers indicated by the instructions of kernel 1 virtual register map 302 are R0, R1, and R2. The PIM kernel scheduler 214 translates the received virtual register addresses into physical register addresses [0], [2], and [7], respectively, in kernel 1 physical register map 306, where the register addresses correspond to addresses in storage devices associated with the PIM kernel scheduler 214, such as registers of storage devices 216-1. Similarly, the registers indicated by the instructions of kernel 2 virtual register map 304 are R0, R1, R2, and R3. The PIM kernel scheduler translates those received virtual register addresses into physical register addresses [3], [4], [8], and [9], respectively, in kernel 2 physical register map 308. Accordingly, the PIM module is able to process kernel instructions that indicate virtual indices. Additionally, in some cases, at least some registers are allocated to a first kernel while at least some registers are allocated to a second kernel.

Figure 4:
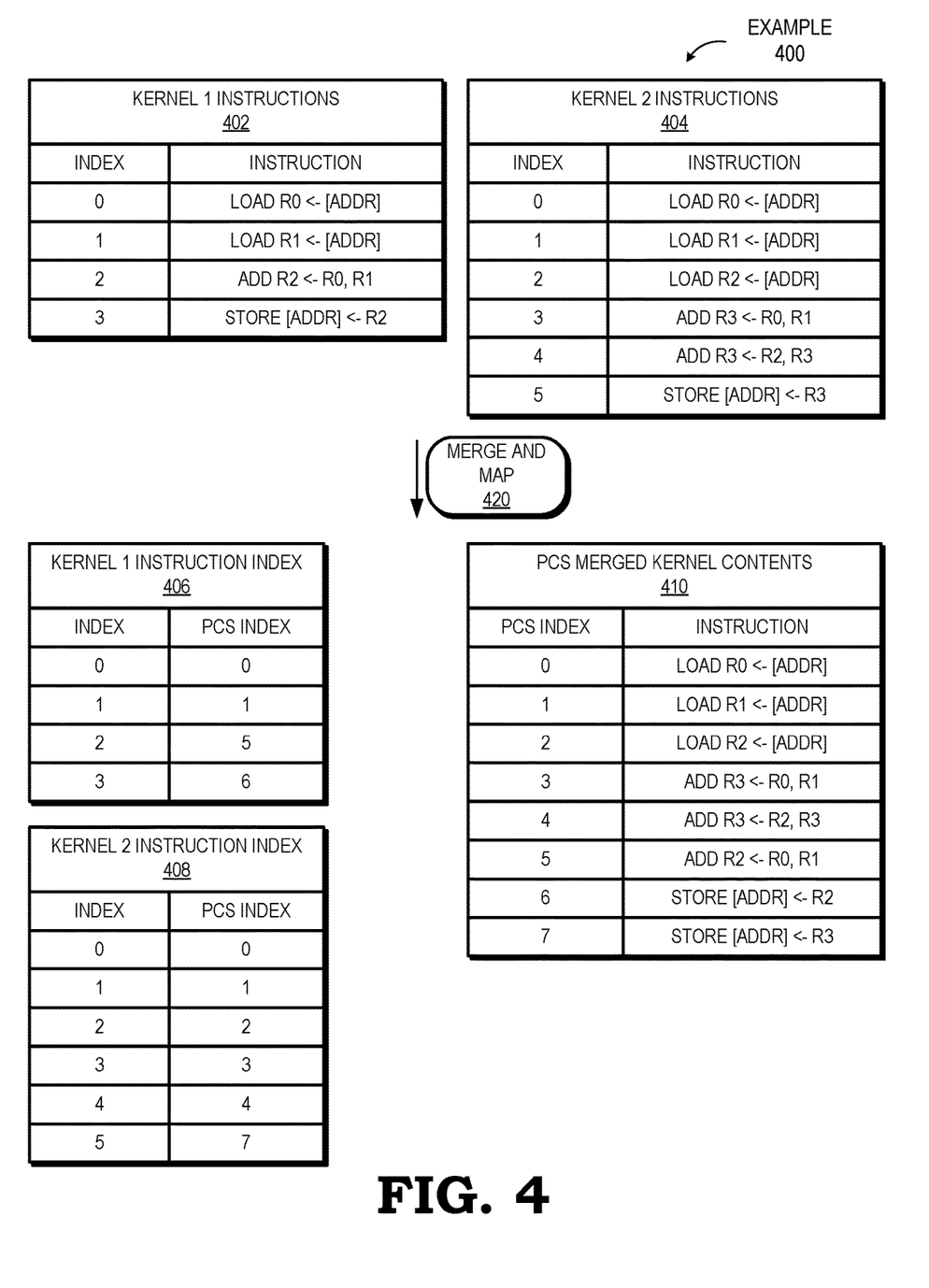
FIG. 4 is a block diagram of an example kernel instruction merging and mapping in accordance with some embodiments.

FIG. 4 illustrates an example 400 kernel instruction merging and mapping 420 in accordance with at least some embodiments. As described above, in some embodiments, the merging and mapping 420 is performed by a PIM kernel scheduler such as PIM kernel scheduler 214-2 of FIG. 2. In the illustrated example 400, kernel 1 instructions 402 and kernel 2 instructions 404 each correspond to respective indices. Prior to storage in a PCS module such as PCS module 212-2, the instructions are merged to reduce storage utilization within the PCS module. Accordingly, "LOAD R0 ← [ADDR]" for both kernel 1 instructions 402 and kernel 2 instructions 404 is merged into physical index 0 in kernel 1 instruction index 406 and in kernel 2 instruction index 408. Additionally, the PIM kernel scheduler determines an order of the instructions, resulting in PCS merged kernel contents 410. As a result, kernel 1 instructions 402 and kernel 2 instructions 404 are processed concurrently by a PIM module such as PIM module 120-2 in the indicated order. Because bank local addresses for individual PIM kernels are generated by host instructions and sent with respective PCS module indices, in some cases, even though the same PCS module entries are used by multiple kernels, different physical registers are used. Thus, the PIM module is able to process kernel instructions for multiple kernels concurrently and resource consumption of the PCS module is reduced.

Figure 5:
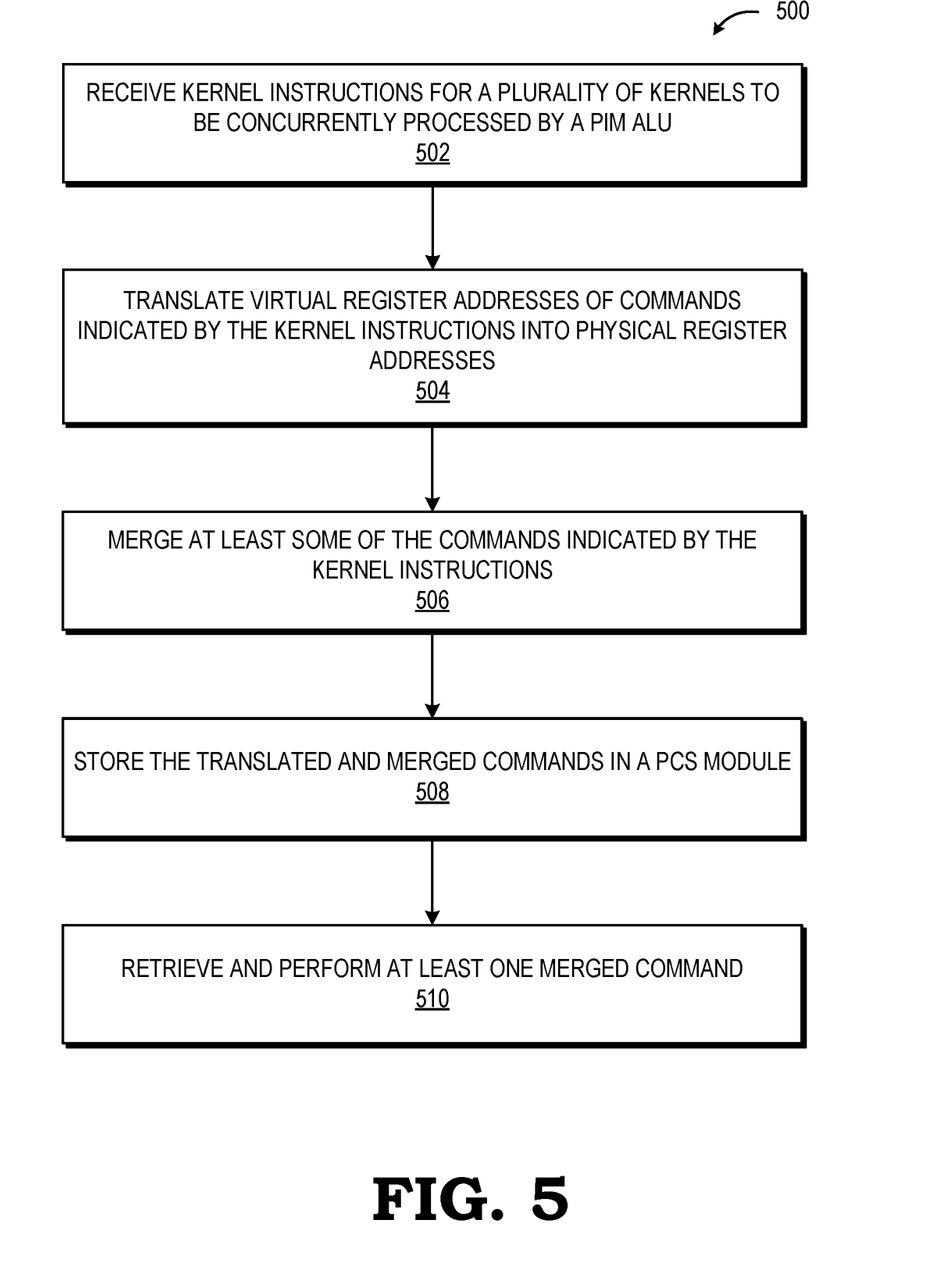
FIG. 5 is a flow diagram of a method of concurrently processing kernel instructions for multiple kernels using a PIM concurrent processing system in accordance with some embodiments.

FIG. 5 is a flow diagram illustrating a method 500 of concurrently processing kernel instructions for multiple kernels using a PIM concurrent processing system in accordance with some embodiments. In some embodiments, method 500 is initiated by one or more processors in response to one or more instructions stored by a computer readable storage medium.

At block 502, kernel instructions for a plurality of kernels to be concurrently processed by a PIM ALU are received. For example, kernel instructions 204 corresponding to multiple kernels to be processed by PIM module 120-1 are received from processing module 104, where an ISA implemented by PIM module 120-1 has fewer instructions than an ISA implemented by processing module 104. At block 504, virtual register addresses of commands indicated by the kernel instructions are translated into physical register addresses. For example, PIM kernel scheduler 214-1 translates virtual register addresses indicated by kernel instructions 204 to physical register addresses of registers of storage devices 216-1.

At block 506, at least some of the PIM commands indicated by the kernel instructions are merged. For example, PIM kernel scheduler 214-1 analyzes the PIM commands indicated by kernel instructions 204 and merges at least some PIM commands based on a combination metric. At block 508, the translated and merged commands are stored in a PCS module. For example, the translated and merged commands are stored in PCS module 212-1. At block 510, at least one merged command is retrieved and performed. For example, at least one PIM command corresponding to at least two PIM kernels is retrieved from PCS module 212-1 and sent to PIM module 120-1 for execution. Accordingly, a method of concurrently processing kernel instructions for multiple kernels is depicted.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A memory device comprising:
   a plurality of storage devices configured to store data on behalf of programs executing at a processing unit, wherein the processing unit is external to the memory device; and
   a processing-in-memory (PIM) circuit configured to process PIM commands in response to kernel instructions corresponding to the programs from the processing unit, wherein an instruction set architecture (ISA) comprising the PIM commands and implemented by the PIM circuit has fewer instructions than an ISA implemented by the processing unit, and wherein processing resources of the PIM circuit are configured to be virtualized such that the PIM circuit concurrently processes PIM commands from multiple PIM kernels.

2. The memory device of claim 1, further comprising:
   a PIM command store (PCS) circuit configured to store the PIM commands and to provide the PIM commands to the PIM circuit, wherein the PCS circuit is configured to be virtualized.

3. The memory device of claim 2, further comprising:
   a PIM kernel scheduler configured to combine portions of at least two kernel instructions corresponding to at least two PIM kernels and store a single PIM command corresponding to the portions of the at least two kernel instructions at the PCS circuit.

4. The memory device of claim 3, wherein:
   the PIM kernel scheduler is further configured to combine the portions of the at least two kernel instructions based on a combination metric.

5. The memory device of claim 4, wherein:
   the combination metric is based on commonalities of respective kernel instructions between PIM kernels awaiting execution at the PIM circuit.

6. The memory device of claim 4, wherein:
   the combination metric is based on a weighted combination of kernel instructions based on expected resource usage of corresponding PIM kernels.

7. The memory device of claim 4, wherein:
   the combination metric is based on a dependency graph of the PIM kernels received from the processing unit.

8. The memory device of claim 3, wherein:
   the plurality of storage devices comprises a register file configured as a register bank.

9. The memory device of claim 8, wherein:
   the PIM kernel scheduler is further configured to translate virtual register addresses indicated by the kernel instructions into physical register addresses of the register file.

10. The memory device of claim 8, wherein:
    a first register of the register file is configured to be allocated to a first PIM kernel of the at least two PIM kernels while a second register of the register file is allocated to a second PIM kernel of the at least two PIM kernels.

11. The memory device of claim 3, wherein:
    the PIM kernel scheduler is further configured to schedule, based on the kernel instructions from the processing unit, the PIM commands for execution at the PIM circuit.

12. The memory device of claim 1, wherein:
the PIM circuit is a PIM arithmetic logic unit (ALU).

13. A method comprising:
receiving, at a processing-in-memory (PIM) arithmetic logic unit (ALU) from a processing unit, kernel instructions for a plurality of kernels to be concurrently processed by the PIM ALU wherein an instruction set architecture (ISA) implemented by the PIM ALU has fewer instructions than an ISA implemented by the processing unit;
retrieving PIM ALU commands corresponding to the kernel instructions from a PIM command store (PCS) circuit, wherein at least one PIM ALU command corresponds to at least two kernels; and
performing the PIM ALU commands comprising storing data for at least two of the kernels in a register bank of a memory that includes the PIM ALU.

14. The method of claim 13, wherein:
the kernel instructions include:
  a respective command index that indicates a respective PIM ALU command and
  at least one respective bank local address.

15. The method of claim 13, further comprising:
prior to retrieving the PIM ALU commands from the PCS circuit, in response to detecting that at least two of the PIM ALU commands corresponding to the kernel instructions request a same operation, storing an indication of the at least two PIM ALU commands at a single entry of the PCS circuit.

16. The method of claim 13, wherein:
retrieving the PIM ALU commands comprises delaying execution of at least one of the PIM ALU commands based on dependencies of corresponding PIM kernels.

17. A system comprising:
a processing unit configured to execute a plurality of programs; and
a memory device configured to receive kernel instructions from the processing unit, wherein the kernel instructions cause a processing-in-memory (PIM) circuit of the memory device to concurrently process PIM commands for a plurality of PIM kernels, wherein concurrently processing PIM commands comprises storing data for at least some of the PIM kernels in a plurality of storage devices of the memory device configured to act as a virtual register bank, and wherein an instruction set architecture (ISA) comprising the PIM commands and implemented by the PIM circuit has fewer instructions than an ISA implemented by the processing unit.

18. The system of claim 17, wherein:
the memory device comprises a PIM command store (PCS) circuit configured to store the PIM commands and to provide the PIM commands to the PIM circuit; and
the processing unit comprises a portion of a PIM kernel scheduler that translates application addresses into PCS addresses and sends the PCS addresses as part of the kernel instructions.

19. The system of claim 17, wherein:
the memory device comprises a second PIM circuit configured to concurrently process second PIM commands for a second plurality of PIM kernels.

20. The system of claim 17, wherein:
the processing unit comprises a coprocessor configured to send the kernel instructions to the memory device.

* * * * *